United States Patent
Olsen et al.

(10) Patent No.: US 10,686,489 B2
(45) Date of Patent: Jun. 16, 2020

(54) RADIO COMMUNICATION

(71) Applicant: Nordic Semiconductor ASA, Trondheim (NO)

(72) Inventors: Eivind Olsen, Trondheim (NO); Sverre Wichlund, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 16/063,182

(22) PCT Filed: Oct. 25, 2016

(86) PCT No.: PCT/GB2016/053322
§ 371 (c)(1),
(2) Date: Jun. 15, 2018

(87) PCT Pub. No.: WO2017/103557
PCT Pub. Date: Jun. 22, 2017

(65) Prior Publication Data
US 2018/0367184 A1   Dec. 20, 2018

(30) Foreign Application Priority Data
Dec. 18, 2015   (GB) .................................. 1522377.9

(51) Int. Cl.
*H04B 1/7075*   (2011.01)
*H04L 27/26*   (2006.01)
(Continued)

(52) U.S. Cl.
CPC ......... *H04B 1/70752* (2013.01); *H04B 1/707* (2013.01); *H04B 1/7087* (2013.01);
(Continued)

(58) Field of Classification Search
CPC combination set(s) only.
See application file for complete search history.

(56) References Cited

U.S. PATENT DOCUMENTS 5,428,647 A    6/1995  Rasky et al.
8,571,010 B1 * 10/2013  Zhang ............... H04W 56/0005
                                            370/351
(Continued)

FOREIGN PATENT DOCUMENTS

EP    0726658 A2    8/1996
WO    WO2014/167318 A2    10/2014
(Continued)

OTHER PUBLICATIONS

Search Report under Section 17(5) for GB1522377.9, dated Aug. 5, 2016, 3 pages.
(Continued)

*Primary Examiner* — Asad M Nawaz
*Assistant Examiner* — Syed Ali
(74) *Attorney, Agent, or Firm* — Klarquist Sparkman, LLP

(57) ABSTRACT

A digital radio receiver (7) is arranged to receive and process data frames, each data frame comprising (i) a plurality of identical synchronization sequences; (ii) identification data different from the synchronization sequences; and (iii) convolution-encoded message data. An initial-synchronization section of the receiver (7) uses the plurality of synchronization sequences in a received data frame to perform a frequency-synchronization or symbol-timing-synchronization operation. A frame-synchronization section determines frame-synchronization information by correlating at least a part of the received identification data against reference identification data stored in a memory. A convolution-decoding section uses the frame-synchronization information to decode the message data.

10 Claims, 4 Drawing Sheets

(51) Int. Cl.
  *H04L 27/00* (2006.01)
  *H04B 1/707* (2011.01)
  *H04L 7/04* (2006.01)
  *H04B 1/7073* (2011.01)
  *H04B 1/7087* (2011.01)

(52) U.S. Cl.
  CPC ..... *H04B 1/70712* (2013.01); *H04B 1/70735* (2013.01); *H04L 7/042* (2013.01); *H04L 27/0014* (2013.01); *H04L 27/26* (2013.01); *H04L 2027/0024* (2013.01)

(56) References Cited

U.S. PATENT DOCUMENTS

| | | | | |
|---|---|---|---|---|
| 8,873,488 B2* | 10/2014 | Cho | ...................... | H04J 11/0069 370/329 |
| 2002/0114298 A1* | 8/2002 | Dotsch | .................. | H04J 3/0605 370/335 |
| 2004/0114552 A1* | 6/2004 | Lim | ..................... | H04B 7/2041 370/324 |
| 2004/0165576 A1 | 8/2004 | Reunamaki | | |
| 2006/0008015 A1* | 1/2006 | Marsili | .................... | H04K 1/00 375/260 |
| 2006/0104335 A1* | 5/2006 | Trachewsky | ............ | H04J 13/00 375/141 |
| 2006/0164883 A1* | 7/2006 | Lablans | ........... | G11B 20/00086 365/185.03 |
| 2009/0141836 A1 | 6/2009 | Shirakata et al. | | |
| 2010/0226463 A1* | 9/2010 | Wang | ...................... | H04L 7/042 375/343 |
| 2010/0284444 A1 | 11/2010 | Lakkis | | |
| 2011/0188614 A1 | 8/2011 | Chen et al. | | |
| 2011/0268206 A1* | 11/2011 | Ge | ............................ | H04L 5/00 375/260 |
| 2012/0155349 A1* | 6/2012 | Bajic | ....................... | H04W 4/80 370/311 |
| 2013/0287142 A1* | 10/2013 | Fimoff | .................. | H04L 1/0054 375/298 |
| 2014/0241384 A1* | 8/2014 | Du | ....................... | H04L 27/2613 370/515 |
| 2015/0016337 A1* | 1/2015 | Chung | ............. | H04W 56/0085 370/328 |
| 2017/0155458 A1* | 6/2017 | He | ......................... | H04L 69/22 |

FOREIGN PATENT DOCUMENTS

WO    WO2014/181075 A1    11/2014
WO    WO2015/183198 A1    12/2015

OTHER PUBLICATIONS

International Search Report and Written Opinion for PCT/GB2016/053322, dated Feb. 7, 2017, 10 pages.

* cited by examiner

RADIO COMMUNICATION

CROSS REFERENCE TO RELATED APPLICATIONS

This is the U.S. National Stage of International Application No. PCT/GB2016/053322, filed Oct. 25, 2016, which was published in English under PCT Article 21(2), which in turn claims the benefit of Great Britain Application No. 1522377.9, filed Dec. 18, 2015.

This invention relates to digital radios.

Various radio communication systems are known for transmitting binary message data. Examples include Bluetooth™ and Bluetooth Low Energy™. It is important for a digital radio receiver to determine timing synchronization quickly and accurately from a received data packet (also called a data frame), in order to be able to decode the message data reliably. It is known to include a predetermined synchronization word, known to both the transmitter and the receiver, near the beginning of each frame, which the receiver can use to perform operations such as symbol timing recovery, frequency offset compensation, Automatic Gain Control (AGC) training and frame synchronization, before the receiver decodes the message data from the frame.

When a received radio signal is weak, it can be harder for the receiver to perform these operations reliably. The present applicant has previously contemplated including in a data packet a synchronization word consisting of two or more identical synchronization sequences to provide for more accurate symbol timing recovery and frequency offset compensation. This approach allows the receiver to use a relatively-short correlator which correlates the incoming signal repeatedly against one instance of the stored synchronization sequence. This is more power efficient than correlating against a longer, non-repeating synchronization sequence. A synchronization circuit can use the distance in time between successive correlator matches (for the successive synchronization sequences) to obtain symbol timing recovery, in addition to the basic match metric of correlator output amplitude.

The use of repeated synchronization sequences (rather than a longer non-repeating synchronization word) does, however, make frame synchronization more difficult, because it is not necessarily possible for the receiver to distinguish between the identical synchronization sequences within the synchronization word. The applicant has recognised that this is a particular problem if data following the synchronization sequences in the frame is protected by a convolution-based forward error correcting (FEC) code. This is because a decoder for a convolution code typically needs to know the location of the start of code in order to be initialized correctly.

The present invention seeks to provide an improved digital radio receiver.

From a first aspect, the invention provides a digital radio receiver arranged to receive and process data frames, each data frame comprising (i) a plurality of identical synchronization sequences; (ii) identification data different from the synchronization sequences; and (iii) convolution-encoded message data, the receiver comprising:

an initial-synchronization section arranged to use the plurality of identical synchronization sequences in a received data frame to perform a frequency-synchronization or symbol-timing-synchronization operation;

a frame-synchronization section arranged to determine frame-synchronization information for the received data frame by correlating at least a part of the received identification data against reference identification data stored in a memory of the receiver; and a convolution-decoding section arranged to use said frame-synchronization information to decode the message data of the data frame.

From a second aspect, the invention provides a method of radio communication, comprising receiving and processing a data frame comprising (i) a plurality of identical synchronization sequences; (ii) identification data different from the synchronization sequences; and (iii) convolution-encoded message data, the method comprising:

using the plurality of identical synchronization sequences in the received data frame to perform a frequency-synchronization or symbol-timing-synchronization operation;

determining frame-synchronization information for the received data frame by correlating at least a part of the received identification data against stored reference identification data; and using said frame-synchronization information to decode the message data of the data frame.

Thus it will be seen that identification data within the data frame is used to obtain frame synchronization for deconvolving the message data, separately from other frequency and/or symbol-timing synchronization operations. This stored reference identification data is preferably identical to the identification data transmitted in the data frame (in practice, of course, noise may mean that the received signal is not exactly the same as the transmitted signal), or comprises at least a part of the transmitted identification data. The identification data may be any data known in advance to the receiver, such as an address of the transmitter or of the receiver. In some preferred embodiments, the identification data is specific to a particular link-layer connection between the radio receiver and a radio transmitter. For example, the identification data may be a Bluetooth™ Low Energy Access Address, or a link-layer connection identifier more generally. Performing frame synchronization using identification data that is already present in a data packet for another purpose is particularly efficient as it avoids needing to lengthen the data packet by including additional data solely for carrying out frame synchronization.

In some embodiments, the identification data may be convolution-encoded, preferably using the same convolution encoding as the message data. The identification data preferably appears at the beginning of a forward-error-correcting code block; in this way its coded value is fixed for a given communication link and does not depend on variable message bits. The reference identification data may also be convolution-encoded, such that the correlation in the frame-synchronization section is performed using coded data. An advantage to correlating on FEC-coded data is that the FEC encoding can help to ensure there is a minimum distance between the respective identification data of two different link-layer connections—e.g. where these are both Bluetooth™ Low Energy Access Addresses—thereby helping to avoid false correlation matches where the identification data is received over a noisy channel.

The identification data is preferably located before the message data in the data packet. They may be adjacent each other. The synchronization sequences are preferably located before the identification data in the data packet. Again, they may be adjacent each other. There may be at two, three, five, ten, twenty or more instances of the synchronization sequence in the synchronization word.

In some embodiments, the identification data may be direct-sequence-spread-spectrum-(DSSS-)encoded in the data frame. If the identification data is convolution-encoded, the DSSS-encoding may be applied around the convolution-encoded identification data. The receiver may therefore comprise a despreader section arranged to despread the DSSS-encoded identification data of the received data frame. The frame-synchronization section is then preferably arranged to correlate at least part of the identification data against the reference identification data after the identification data has been despread. The inventors have realised that correlating against the identification data after despreading provides acceptable frame synchronization with a much lower power requirement for the correlator than if the correlation were to be performed before despreading. The correlation length is much shorter. Moreover, the despreader section preferably receives data in complex (I and Q) format, but outputs data in real format. This means that the correlator need only act on real data, rather than on the complex DSSS-encoded data.

The frame-synchronization section may have a configurable error threshold for determining whether a correlation match has been found. If a perfect match were required, the bit error rate (BER) in the coded stream would be likely to yield an unacceptable packet loss ratio due to missing frame synchronization, The convolution-encoded message data may also be DSSS-encoded (outside the convolution encoding). The despreader section may be arranged to despread the message data in addition to despreading the identification data.

The message data may comprise or consist of one or more protocol fields such as a rate indicator, or it may consist entirely of a data payload that has meaning only at a higher protocol layer, above a physical layer and a data link layer. The data frame may include additional message data which is not FEC-encoded, or which is convolution-encoded or block-encoded in a different block from the first message data. For example, a data frame may comprise (i) a synchronization word, followed by (ii) a first DSSS-encoded convolution-encoded block which includes an access address followed by a rate indicator, followed by (iii) a second DSSS-encoded FEC-encoded block which includes an "arbitrary" data payload. The FEC-encoded data payload may be encoded using a convolution code or a block code. If the data payload is block-encoded, the convolution-encoded message data can be considered to comprise the rate indicator (and optionally any other data in the first block which follows the identification data, such as the second half of an access address, if only the first half of the access address is used as the identification data).

The frequency-synchronization or symbol-timing-synchronization operation may include one or more of: symbol timing recovery and frequency offset compensation. The receiver may also use the synchronization sequences (together defining a synchronization word) for Automatic Gain Control (AGC) training.

The initial-synchronization section preferably comprises a correlator arranged to repeatedly correlate the received synchronization sequences against all or part of a single synchronization sequence.

The convolution-decoding section preferably comprises a Viterbi decoder.

The frame-synchronization section may correlate the whole received identification data against reference identification data, or it may correlate on only a part of the received identification data—e.g. the first quarter or half. This is because the full identification data may not be needed to obtain reliable frame synchronization, and it saves power to correlate on only a part of the data. In this latter case, the stored reference identification data would typically only include the same part that is required by the correlator.

In some embodiments, the convolution-decoding section may be pre-initialised with at least a portion of the identification data—e.g. before or shortly after the frame-synchronization section has finished it correlating operation. This is possible because the receiver will generally already know the identification data of the data frames that it is tuned to receive. In this way, the convolution-decoding section can start decoding the data frame as soon as the frame-synchronization section has achieved synchronization, without needing to buffer the identification data (which is consumed by the frame-synchronization section). If a correlation is found by the frame-synchronization section, all or part of reference identification data has effectively already been decoded by the receiver, and so the pre-initialization of the convolution-decoding section with noise-free stored reference identification data can be affirmed as valid. Frame synchronization may require only a part (e.g., the first half) of the identification data, in which case the convolution-decoding section need be pre-initialised only with the part that has been used by the frame-synchronization section.

In some embodiments, a phase output of the de-spreader section described above may be used to compensate for carrier frequency drift.

The receiver may comprise a CORDIC for compensating carrier frequency offset and/or drift. The receiver may comprise a joint timing and frequency estimator.

Features of any aspect or embodiment described herein may, wherever appropriate, be applied to any other aspect or embodiment described herein. Where reference is made to different embodiments or sets of embodiments, it should be understood that these are not necessarily distinct but may overlap.

Certain preferred embodiments of the invention will now be described, by way of example only, with reference to the accompanying drawings, in which.

Figure 1:
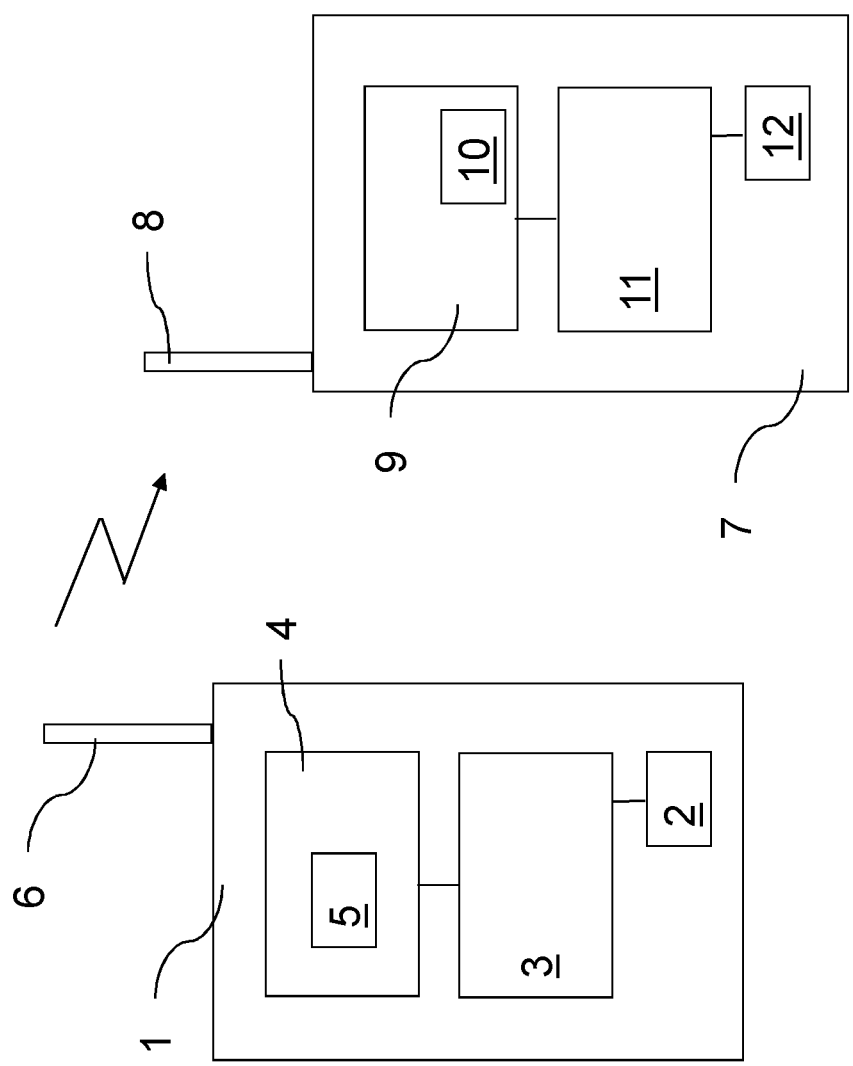
FIG. 1 is a schematic drawing of a radio communication system including a receiver embodying the invention.

FIG. 1 shows a wireless heart-rate monitor 1 which is in communication with a mobile telephone 7. The mobile telephone 7 embodies the present invention.

The wireless heart-rate monitor 1 has a heart-rate sensor 2 which is connected to a microprocessor 3 (such as an ARM™ Cortex M-series). The microprocessor 3 is connected to a radio transmitter 4. The radio transmitter 4 includes an encoder 5 (among other components). Other conventional components, such as memory, a battery, etc. are also present, but are omitted from the drawing for the sake of simplicity. The microprocessor 3 and radio transmitter 4 may be integrated on a single silicon chip. The monitor 1 has a radio antenna 6, which may be integrated on such a chip or external to it.

The mobile telephone 7 has, among other conventional components (not shown), an antenna 8, suitable for receiving short-range radio communications from wireless-personal-area-network devices, which is connected to a radio receiver 9. The radio receiver 9 includes synchronization and decoding logic 10, among other components. The radio receiver 9 is connected to a microprocessor 11 (such as an ARM™ Cortex M-series), which can output data for display on a screen 12, possibly via other components, such as a further microprocessor (not shown) running an operating system and appropriate software applications.

In use, the wireless heart-rate monitor 1 receives periodic heart-rate readings for a human user from the heart-rate sensor 2. The microprocessor 3 processes the readings into a suitable format for transmission, and sends the message data to the radio transmitter 4. In some embodiments, the message data may already be differentially encoded, in order to improve the efficiency of the decoding operation on the radio receiver 9. The radio transmitter 4 determines whether the message data can fit within a single data packet, or if it must be split across two or more data packets. The encoder 5 in the radio transmitter 4 encodes the message data using a convolution-based forward-error-correcting code. It prepends a link-layer Access Address (cAA) and a rate indicator (RI) to the encoded message data to create a payload. It then DSSS-encodes this entire payload using a fixed chip sequence. For example, each '1' bit might be represented by the 4-bit sequence [1 1 0 0] and each '0' bit represented by the sequence [0 0 1 1]. Of course, other lengths of chip sequence may be used, which may or may not be powers of two. The transmitter 4 then prepends a synchronization word to the payload, consisting of 10 repetitions of a predetermined sequence, S1=[0 0 1 1 1 1 0 0] (for example).

The radio transmitter 4 then transmits the encoded data packet from the antenna 6, modulated on a radio-frequency carrier (e.g. at around 2.4 GHz), using two-level GFSK with a modulation index of 0.5. The data packet may contain additional elements, such as a preamble, if appropriate.

Figure 2:
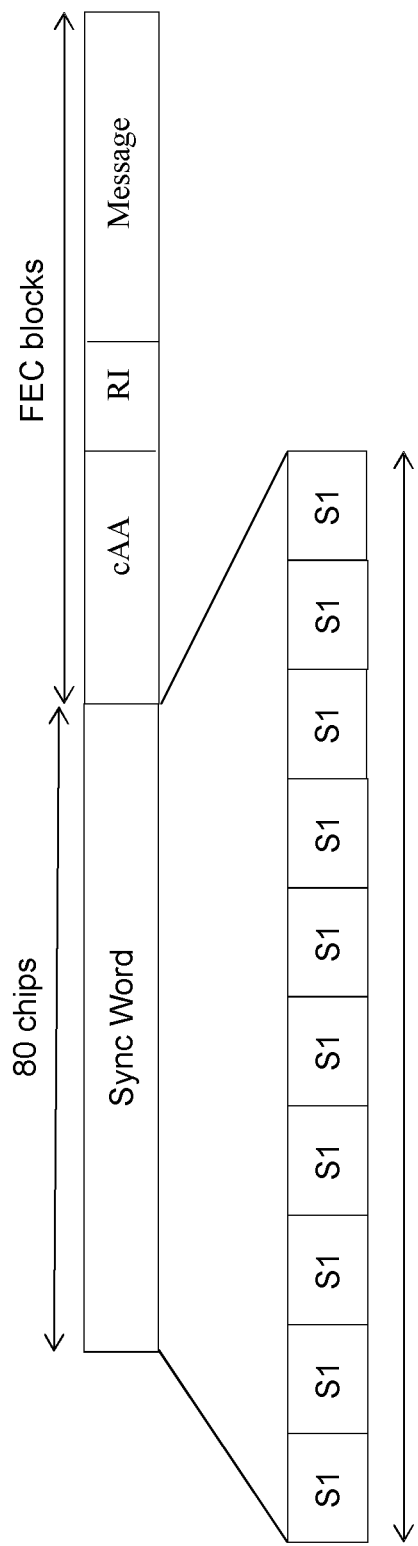
FIG. 2 is a diagram of a data packet that may be transmitted and received by the radio communication system.

FIG. 2 shows an exemplary data packet structure, which includes a synchronization word and an FEC-encoded data payload. The data payload contains a coded access address (cAA) and a rate indicator in a first FEC block. The rate indicator contains data about the encoding of a second FEC block containing additional message bits.

In use, the mobile telephone 7 receives the radio data packet at the antenna 8. The radio receiver 9 processes the GFSK signal using the synchronization and decoding logic 10. The receiver 9 first correlates the received signal with the 8-bit synchronization sequence [0 0 1 1 1 1 0 0], in order to determine symbol timing recovery and frequency offset correction.

The repetitive synchronization sequence has the advantage that the synchronization logic 10 can qualify on distance in time between correlator matches in addition to the basic match metric (correlator output amplitude).

This can be exploited to lower the correlator threshold for qualified matches, while maintaining robustness against false detections. This in turn means that an 8-bit correlator can be used to achieve a high level of sensitivity at low receiver complexity. Another advantage of this pulse train synchronization is that, if a correlator frame longer than the repeat sequence is used, as may be the case in some embodiments, the receiver correlator coefficients will also be a repeated sequence. This simplifies the implementation of longer correlators, while maintaining their basic noise averaging qualities.

The radio receiver 9 then despreads the data payload, using the acquired timing synchronization to do so. This operation is explained in more detail below. The real-valued output of the despreading is sent to a Viterbi decoder for deconvolving the output. However, the Viterbi decoder needs to be initialised correctly in order to be able to remove the FEC-encoding correctly. This is accomplished by also correlating the despread output against a stored representation of the coded Access Address (cAA). Because the Access Address is fixed for a given connection, and because it appears at the beginning of the first FEC block, its FEC-encoded value, cAA, can be determined in advance and stored in the radio receiver 9 for use in this correlation operation. This correlation operation is explained in more detail below. The correlation provides frame synchronization information which is then used to initialise the Viterbi decoder.

The radio receiver 9 then passes the decoded message data to the microprocessor 11 for processing. The microprocessor 11 may process it in any appropriate way. In some embodiments, heart-rate information may be displayed graphically on the display screen 12 for the user to see.

The wireless heart-rate monitor 1 and mobile telephone 7 may be configured so that heart-rate message data is transferred from the wireless heart-rate monitor 1 to the mobile telephone 7 substantially according to the Bluetooth Low Energy (BTLE)™ core specification version 4.0, with the exception of the physical layer. The wireless heart-rate monitor 1 and mobile telephone 7 may be equipped for two-way radio communication, using corresponding components for radio transmission in the opposite direction, although this is not essential.

Figure 3:
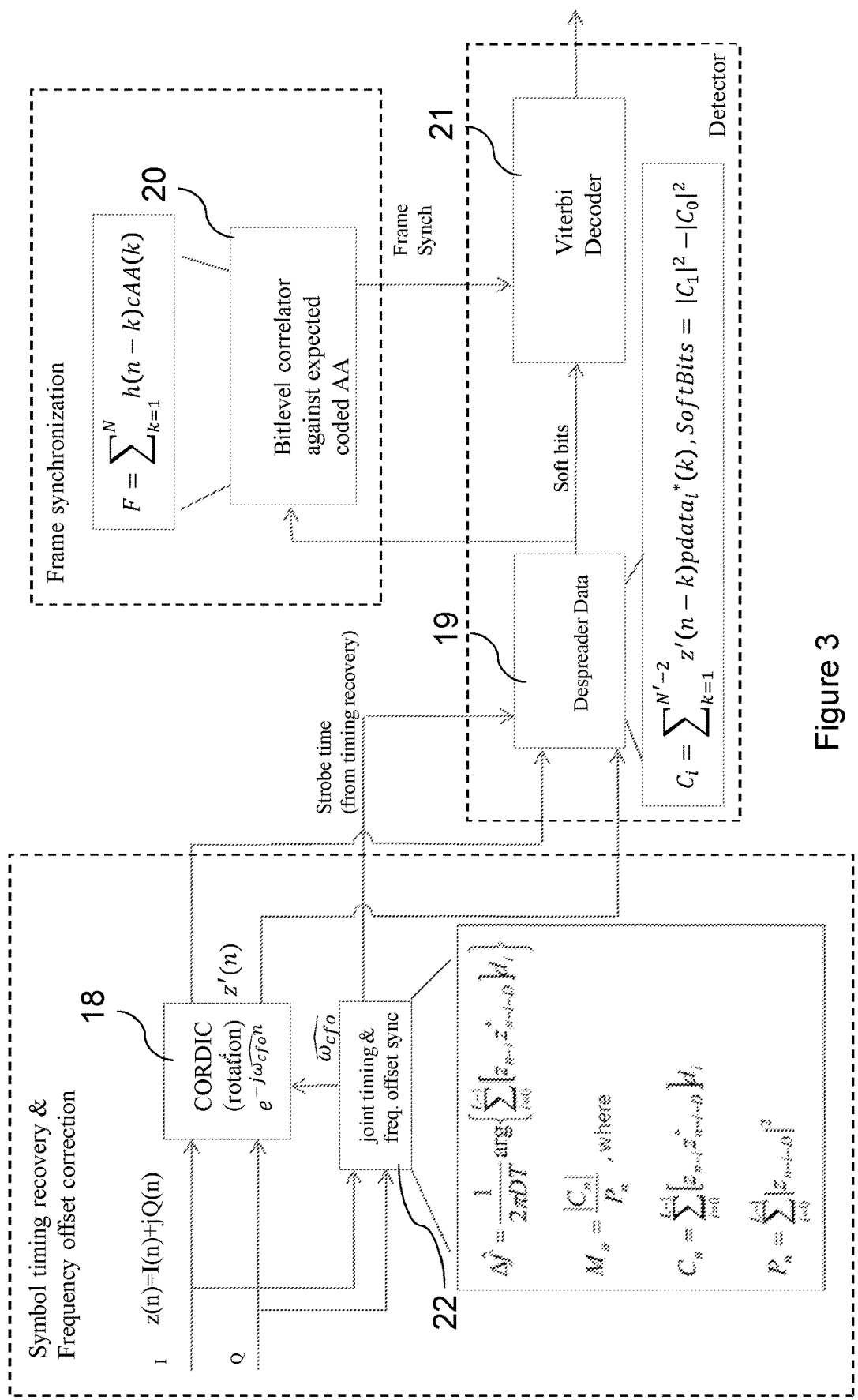
FIG. 3 is schematic drawing of part of a radio receiver embodying the invention.

FIG. 3 shows detail of a digital baseband processing stage of a radio receiver embodying the invention. This could be the same radio receiver 9 as described above, or it could be a different radio receiver.

Steps such as filtering and residual frequency offset tracking are not shown for reasons of conciseness. The design of the radio receiver aims to optimize sensitivity while tolerating realistic channel conditions (carrier frequency offset, carrier drift, fading, etc.).

Complex-valued baseband samples are shown entering from the left side of FIG. 3. These are passed to a CORDIC unit 18, and from there to a despreader unit 19. The despreader unit 19 performs a cross correlation between the incoming data and one or more stored chip sequences. The output of the despreader unit 19 is passed to a bit-level coded-Access-Address correlation unit 20, and then on to a Viterbi decoder unit 21. The incoming samples are also passed to a synchronization unit 22 which performs timing synchronization and initial carrier frequency offset estimation.

FIG. 3 contains the following abbreviations:
n=chip index;
m=symbol index;
$z(n)$=complex baseband samples;
$z'(n)$=carrier-frequency offset (CFO) compensated $z(n)$;
$h(n)$=hard decision bits from despread data;
cAA=replica of expected coded access address;
$p(k)$=complex values representing the data chip sequence on the phase cylinder after FSK modulation.

The synchronization is built around a particular kind of correlator. The correlator is a data-aided joint timing and frequency estimator which exploits knowledge of the data in the received symbols to cancel the effect of the modulation on the estimate of a conventional delay-and-correlate type of carrier frequency offset estimator. The principle behind the synchronization is described in WO 2014/167318, by the present applicant, the entire contents of which are hereby incorporated by reference.

Because a repetitive synchronization word is received, additional checks on the time domain distances between successive magnitude responses can be used to filter out false detections. This means that a shorter correlator with a lower detection threshold can be used to achieve a given level of sensitivity lowering receiver complexity.

The "joint timing & freq. offset sync" synchronization unit 22 in FIG. 3 carries out the following cross correlation for every incoming baseband sample $z_n = I(n)+jQ(n)$:

$$\Delta \hat{f} = \frac{1}{2\pi DT} \arg\left\{ \sum_{i=0}^{L-1} [z_{n-i} z^*_{n-i-D}] d_i \right\},$$

where L is the number of samples representing an up-sampled "sync word", which is defined as a number of repetitions of the sequence S1 above; where D is a lag which is decided at design time; and where T is the sample period.

The coefficients are given as $d_i = p_i^* p_{i+D}$ where p are the samples constituting the up-sampled and modulated sync word bits. The correlator should be sampled at the right point in time for the frequency offset estimate to be valid, and this time instant is when a "peak" is observed in the value of $M_n$ given by:

$$M_n = \frac{|C_n|}{P_n}, \text{ where } C_n = \sum_{i=0}^{L-1} [z_{n-i} z^*_{n-i-D}] d_i \text{ and}$$

$$P_n = \sum_{i=0}^{L-1} |z_{n-i-D}|^2.$$

A valid peak in $M_n$ is determined against a programmable threshold. A successful synchronization event is defined by the observation of a few valid peaks spaced apart in time by amounts corresponding to the "sync word" length, plus or minus a value, $\Delta$, to account for noise. This synchronization event furthermore defines the strobe time to be used for subsequent detection of the data symbols.

The coefficients $d_i = p_i^* p_{i+D}$ are calculated at design time.

The CFO-compensated sequence of complex baseband samples z'(n) is processed by the digital-baseband-correlator despreader unit 19. This calculates $C_i = \sum_{k=1}^{N'-2} z'(n-k)$ pdata$_i^*(k)$ and outputs real-valued SoftBits=$|C_1|^2 - |C_0|^2$ to the bit-level coded-Access-Address correlation unit 20 and to the Viterbi decoder unit 21.

The coded-Access-Address correlation unit 20 performs a correlation operation $F = \sum_{k=1}^{N} h(n-k) cAA(k)$ using a stored version of the coded Access Address, in order to determine the frame synchronization for the incoming data frame.

The message data bits are then determined by the Viterbi decoder unit 21, which operates in a conventional manner.

Figure 4:
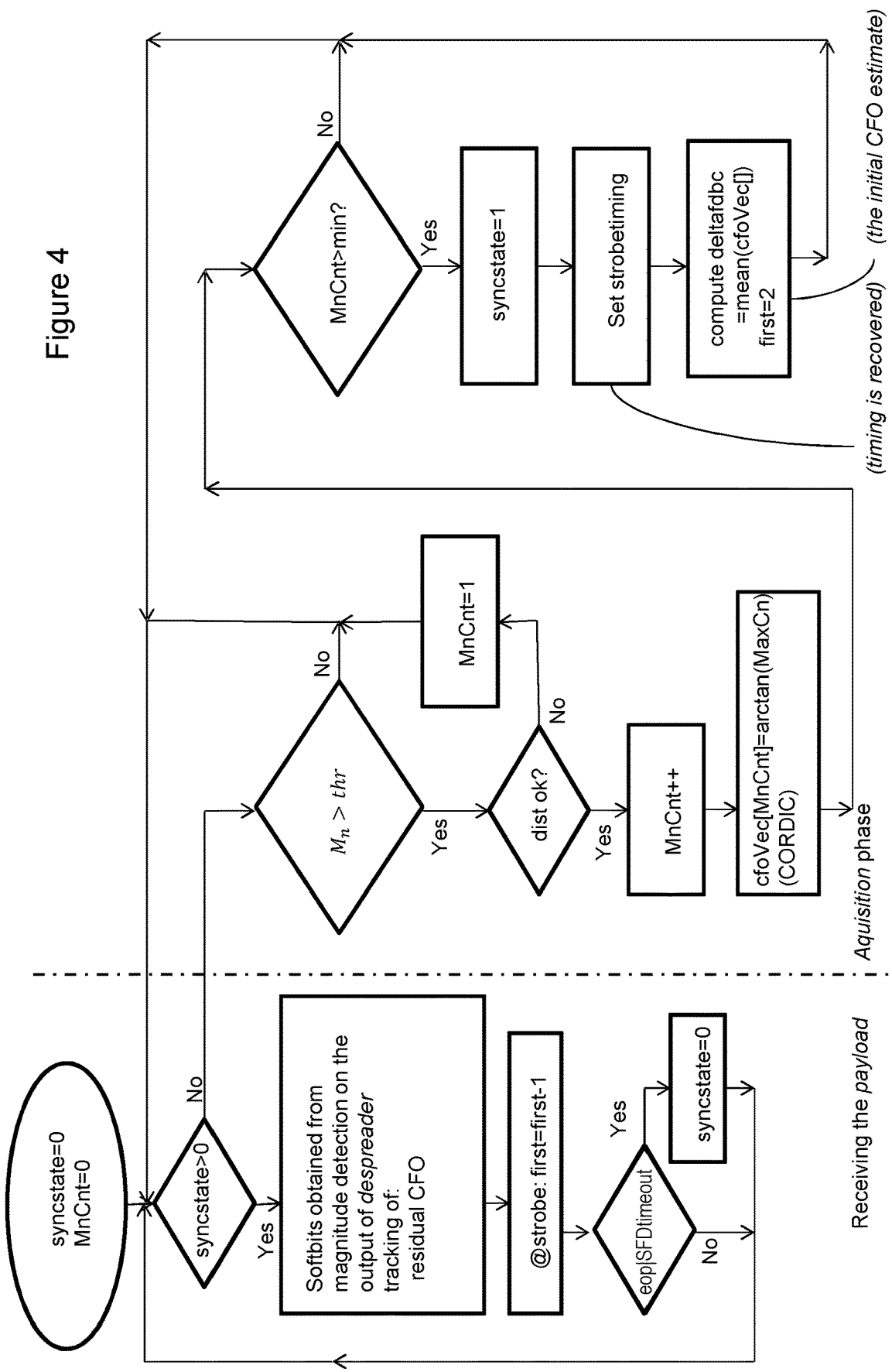
FIG. 4 is a state diagram for this radio receiver.

FIG. 4 shows a finite state machine (FSM) that can orchestrate the synchronization process and outer DSSS decoding in a radio receiver as illustrated in FIG. 3.

The state of this FSM is given by the variable syncstate. At time t=0 the FSM starts out in syncstate=0. In this state the FSM is to the right side of the dashed line in FIG. 4, and is looking for "peaks" in the value of $M_n$ computed by the synchronization unit 22. For each "peak", the $\Delta \hat{f}$ value is recorded in a vector element cfoVec[MnCnt], and the "peak" counter MnCnt is incremented by one. When a sufficient minimum number min of such peaks with a certain distance dist between each peak has been observed, initial timing and carrier frequency offset synchronization is achieved and syncstate is incremented by one.

The average time of the "peaks" as measured by a counter (which counts modulo the number of samples per symbol) defines the subsequent symbol boundaries (strobe timing). Additionally, an initial carrier frequency offset estimate is computed as the average of the elements in the vector cfoVec. This value, $\overline{\omega_{cfo}}$, is then passed to the CORDIC unit 18.

Now, with syncstate>0, the FSM enters the left side of the dashed line in FIG. 4, for receiving the message. In this state, the message data bits are determined in the decoder unit 21 as described above. Additionally, the residual carrier frequency offset (CFO) is tracked and $\omega_{CFO}$ is computed. In turn, this value is used to update (by being added to) the value $\overline{\omega_{cfo}}$ in the CORDIC unit 18.

The invention claimed is:

1. A digital radio receiver comprising an antenna for receiving radio data frames, each data frame comprising (i) a plurality of identical synchronization sequences;
    (ii) identification data; and (iii) convolution-encoded message data, wherein the receiver further comprises a memory, and synchronization and decoding logic that comprises:
    an initial-synchronization section comprising an input for receiving complex-valued baseband samples representing a received data frame, and comprising a correlator configured to perform a frequency-synchronization or symbol-timing-synchronization operation by repeatedly cross-correlating the plurality of identical synchronization sequences in the received data frame against all or part of a single synchronization sequence;
    a frame-synchronization section comprising an input for receiving data representing the received data frame, and comprising a correlator configured to determine frame-synchronization information for the received data frame by cross-correlating at least a part of the received identification data against reference identification data stored in the memory of the receiver, and comprising an output for outputting the frame-synchronization information, wherein the received identification data is different from the synchronization sequences; and
    a convolution-decoding section comprising a Viterbi decoder unit and comprising an input for receiving the frame-synchronization information from the frame-synchronization section, wherein the convolution-decoding section is configured to use the received frame-synchronization information to initialize the Viterbi decoder unit for decoding the message data of the data frame.

2. The digital radio receiver of claim 1, wherein the stored reference identification data is identical to the identification data transmitted in the received data frame.

3. The digital radio receiver of claim 1, wherein the reference identification data is convolution-encoded, and wherein the frame-synchronization section is configured to correlate convolution-encoded received identification data against the convolution-encoded reference identification data.

4. The digital radio receiver of claim 1, wherein the digital radio receiver comprises a despreader section configured to despread direct-sequence-spread-spectrum-(DSSS-)encoded identification data in the received data frame.

5. The digital radio receiver of claim 4, wherein the despreader section is configured to receive data in complex format, but to output data in real format.

6. The digital radio receiver of claim 4, wherein the frame-synchronization section is configured to correlate at least part of the identification data against the reference identification data after the identification data has been despread.

7. The digital radio receiver of claim 4, configured to use a phase output of the de-spreader section to compensate for carrier frequency drift.

8. The digital radio receiver of claim 1, configured to pre-initialize the convolution-decoding section with at least a portion of the identification data.

9. The digital radio receiver of claim 1, wherein the received identification data is a link-layer connection identifier.

10. The digital radio receiver of claim 1, wherein the received identification data is an address of a radio transmitter or of the radio receiver.

* * * * *